(12) United States Patent
Scherer et al.

(10) Patent No.: US 12,152,644 B2
(45) Date of Patent: Nov. 26, 2024

(54) COMPRESSED-AIR DISC BRAKE AND PRESSURE PIECE THEREFOR

(71) Applicant: ZF CV Systems Europe BV, Brussels (BE)

(72) Inventors: Vitalij Scherer, Leimen (DE); Marco Englmeier, Cologne (DE); Roman-Marius Mittendorf, Heppenheim (DE); Peter Moser, Waibstadt-Daisbach (DE)

(73) Assignee: ZF CV Systems Europe BV, Brussels (BE)

( * ) Notice: Subject to any disclaimer, the term of this patent is extended or adjusted under 35 U.S.C. 154(b) by 369 days.

(21) Appl. No.: 17/619,674

(22) PCT Filed: Jun. 19, 2019

(86) PCT No.: PCT/EP2019/066186
§ 371 (c)(1),
(2) Date: Dec. 16, 2021

(87) PCT Pub. No.: WO2020/253955
PCT Pub. Date: Dec. 24, 2020

(65) Prior Publication Data
US 2022/0356916 A1   Nov. 10, 2022

(51) Int. Cl.
*F16D 55/226* (2006.01)
*F16D 55/2255* (2006.01)

(52) U.S. Cl.
CPC ....... *F16D 55/226* (2013.01); *F16D 55/2255* (2013.01)

(58) Field of Classification Search
CPC .... F16D 55/22; F16D 55/226; F16D 55/2255; F16D 65/092; F16D 65/095; F16D 65/567; F16D 2065/026
(Continued)

(56) References Cited

U.S. PATENT DOCUMENTS 3,677,373 A * 7/1972 Lucien ................. F16D 65/092
188/73.38
4,106,595 A * 8/1978 Kimura ................. F16D 55/227
188/73.39
(Continued)

FOREIGN PATENT DOCUMENTS

CN    1761822 A    4/2006
CN  102119286 A    7/2011
(Continued)

OTHER PUBLICATIONS

DE 29802031 U1, Translation. (Year: 1998).*
(Continued)

*Primary Examiner* — Thomas J Williams
(74) *Attorney, Agent, or Firm* — Dickinson Wright PLLC (57) ABSTRACT

A vehicle brake (2, 102), in particular a utility vehicle compressed-air disc brake, includes a brake caliper (4, 104), a pressure piece guide (8, 108), which is arranged in the brake caliper (4, 104), and a pressure piece (6, 106), which is guided in the pressure piece guide (8, 108) along a movement axis (10, 110). The pressure piece guide (8, 108) is designed as a recess (12, 112), and the pressure piece (6, 106) has an outer contour (14, 114) corresponding to the recess. The pressure piece guide (108) and/or the outer contour (14) of the pressure piece are/is divided, on both sides of the pressure piece (6), into a plurality of curved, mutually spaced partial surfaces (16, 116).

20 Claims, 10 Drawing Sheets

(58) Field of Classification Search
USPC .......... 188/73.39, 73.41, 73.42, 73.43, 73.46
See application file for complete search history.

(56) References Cited

U.S. PATENT DOCUMENTS

| | | | | |
|---|---|---|---|---|
| 4,515,249 | A * | 5/1985 | Escarabajal | F16D 65/0975 |
| | | | | 188/73.38 |
| 5,433,298 | A * | 7/1995 | Antony | F16D 65/183 |
| | | | | 188/71.9 |
| 7,475,759 | B1 * | 1/2009 | Sherman, II | F16D 55/227 |
| | | | | 188/73.46 |
| 10,161,445 | B2 * | 12/2018 | Klaas | F16D 65/567 |
| 10,309,472 | B2 * | 6/2019 | Klaas | F16D 65/567 |
| 10,648,522 | B2 * | 5/2020 | Philpott | F16D 55/22 |
| 2011/0127120 | A1 * | 6/2011 | Stumpf | F16D 55/22 |
| | | | | 188/219.1 |
| 2017/0292576 | A1 * | 10/2017 | Henning | F16D 65/567 |
| 2019/0136925 | A1 | 5/2019 | Grosskopf et al. | |
| 2022/0356916 | A1 * | 11/2022 | Scherer | F16D 55/2255 |

FOREIGN PATENT DOCUMENTS

| | | | |
|---|---|---|---|
| CN | 103221711 A | 7/2013 | |
| CN | 107110258 A | 8/2017 | |
| CN | 109154341 A | 1/2019 | |
| DE | 29802031 U1 * | 4/1998 | .......... F16D 65/092 |
| DE | 102012006101 A1 | 9/2013 | |
| DE | 102014017430 A1 | 5/2016 | |
| DE | 102015112497 A1 | 2/2017 | |
| EP | 2559909 A1 | 2/2013 | |
| EP | 2754912 A2 | 7/2014 | |
| EP | 3101304 A1 | 12/2016 | |
| WO | 2013143996 A1 | 10/2013 | |
| WO | 2015004082 A2 | 1/2015 | |
| WO | 2015107135 A1 | 7/2015 | |

OTHER PUBLICATIONS

European Patent Office, Rijswijk, Netherlands, International Search Report of International Application No. PCT/EP2019/066186, Mailed Mar. 9, 2020, 2 pages.

* cited by examiner

COMPRESSED-AIR DISC BRAKE AND PRESSURE PIECE THEREFOR

FIELD

The invention relates to a vehicle brake, in particular a utility vehicle compressed-air disk brake, having a brake caliper, a pressure piece guide, which is arranged in the brake caliper, and a pressure piece, which is guided in the pressure piece guide along a movement axis, wherein the pressure piece guide is designed as a recess, and the pressure piece has an outer contour corresponding to the recess.

BACKGROUND

Vehicle brakes of this kind, in which a "pressure piece" is guided along a movement axis in a pressure piece guide arranged in a brake caliper, may use "guide strips" or, alternatively, crescent-shaped guides for guiding the pressure piece in the brake caliper.

Guide strips offer the advantage that the guide play of a pressure piece in the pressure piece guide can be set independently of the direction by simple adaptation of the guide strips. However, a significant disadvantage of such guide strips is that their production is expensive, which has a disadvantageous effect on production costs.

The crescent-shaped guides, which are likewise known, are significantly simpler and, overall, can be produced at lower cost. However, the basic crescent-shaped geometry of these guides makes it more difficult to set the guide play between the pressure piece and the pressure piece guide. In particular, the crescent-shaped guide is associated with coupling of the lateral guide play in the directions to be supported.

The lateral guide play has components in a first direction and a second direction orthogonal thereto, in each case transversely with respect to the longitudinal axis of the pressure piece. In this context, the longitudinal axis of the pressure piece is understood to be the main direction of movement of the pressure piece when the braking function is performed. When the vehicle brake is conventionally mounted, the first direction is, for example, vertical, and the second direction is horizontal. With respect to the alignment relative to the brake disk, the first direction should be understood, for example, as the radial direction, and the second direction is to be understood as the circumferential direction, i.e. tangential direction.

In this case, it proves to be particularly disadvantageous that the lateral guide play in the first direction and in the second direction can be set only insufficiently independently of one another.

SUMMARY

It is therefore the object of the present invention to develop a vehicle brake having a pressure piece and a guide in such a way that the disadvantages found in the prior art are as far as possible eliminated. In particular, the intention is to specify a vehicle brake whose pressure piece or pressure piece guide can be produced at low cost and where, at the same time, simple, very largely independent and precise setting of the lateral guide play in the first and the second direction can be performed.

According to the invention, the problem of the prior art is solved wherein the pressure piece guide and/or the outer contour of the pressure piece are/is divided, on both sides of the pressure piece, into a plurality of curved, mutually spaced partial surfaces.

By way of such a configuration of these partial surfaces, selective and very largely independent adjustability of the lateral guide play is possible in the first and second directions. At the same time, such partial surfaces can be produced with less effort when compared with guide strips.

In one aspect of the invention, the partial surfaces have contact surfaces for supporting the pressure piece on the pressure piece guide, wherein the contact surfaces extend at least partially in the direction of the movement axis, and wherein the contact surfaces on the pressure piece have a convex curvature in a reference plane region perpendicular to the movement axis of the pressure piece, while the opposite contact surfaces on the recess have a preferably corresponding concave curvature in the reference plane region. In the present case, those surfaces at which the pressure piece and the recess come into contact with one another are taken to be contact surfaces.

Because of this curved design of the contact surfaces in such a way that, depending on their arrangement on the pressure piece, they have a convex curvature or, in the case of arrangement on the recess, a concave curvature, the area of the contact region between the pressure piece and the pressure piece guide is kept sufficiently small, it being possible at the same time for the guide play to be set in a selective manner by way of selective design, for example by way of a selective arrangement, or by way of a selective curvature profile of the contact surfaces. In particular, this makes it possible to set the lateral guide play in the first and second directions very largely independently of one another.

According to a preferred embodiment, the concave curvature and/or the convex curvature defines a partial circle in the reference plane region. On the one hand, partial circles of this type can be produced precisely with a manageable production cost and have proven advantageous for setting the guide play.

Furthermore, according to a preferred embodiment, the pressure piece guide and/or the pressure piece have/has a first contact surface pair for lateral guidance of the pressure piece in the first direction and/or a second contact surface for lateral guidance of the pressure piece in the second direction. By way of such a configuration, it is possible on the one hand for operating forces and torques to be transmitted reliably from the pressure piece to the pressure piece guide and vice versa, and at the same time for the lateral guide play in the first and second directions to be set largely independently of one another.

Preferably, at least one of the contact surfaces of the contact surface pair is formed in the reference plane region in each case by a partial circle section having a first radius $R_1$ and a radius center point C1 and/or the second contact surface is formed in the reference plane region by a partial circle section having a second radius $R_2$ and a second radius center point C2. By way of a suitable selection of the radii $R_1$ and $R_2$ and of the radius center points C1 and C2, the lateral guide play in the first and second directions can be suitably set.

It is preferred here that the radii $R_1$ and $R_2$ differ from one another in size. In addition or as an alternative, it is preferred that the radius center points C1 and C2 differ from one another.

In one aspect, separating surfaces are arranged between the contact surfaces. The arrangement of such separating surfaces between the contact surfaces has proven advantageous for decoupling the lateral guide play in the first and second directions from one another.

According to a preferred embodiment, the separating surfaces of the pressure piece guide have a curvature in the reference plane region which differs from the curvature of the contact surfaces, and/or the separating surfaces have a curvature on the pressure piece in the reference plane region which differs from that of the contact surfaces on the pressure piece. In this case, the direction of curvature of the separating surfaces is preferably opposite in some section or sections to the direction of curvature of the contact surfaces, in relation to the corresponding component, the pressure piece or pressure piece guide, in order at the same time to achieve a smooth transition between the contact surfaces and the separating surfaces and a spacing between the pressure piece and the pressure piece guide.

It is furthermore preferred that at least one separating surface, preferably a plurality or all of the separating surfaces, define a partial circle in the reference plane region, at least in some section or sections.

According to an alternatively preferred embodiment, the separating surfaces and the partial surfaces of the contact surfaces merge into one another without interruption, in particular continuously, that is to say without kinks and jumps. Such uninterrupted transitions are preferably formed directly between in each case curved surface sections, or uncurved intermediate sections are arranged between in each case two curved surface sections.

According to an alternatively preferred embodiment, intermediate sections are arranged, preferably without kinks, at the transition between two curved sections. Such intermediate sections can be designed as a straight line or as an alternatively designed section, for instance.

The invention has been described above with reference to a vehicle brake. In a further aspect, the invention relates to a pressure piece or a brake caliper for a vehicle brake, in particular for a utility vehicle compressed-air disk brake.

In respect of the pressure piece or the brake caliper, the invention achieves the objects described above in that the pressure piece has an outer contour which is divided into a plurality of mutually spaced partial surfaces, or the brake caliper has a pressure piece guide with a recess which is divided into a plurality of mutually spaced partial surfaces.

In the case of the pressure piece, in one aspect the partial surfaces have contact surfaces for supporting the pressure piece on a pressure piece guide, wherein the contact surfaces extend at least partially in the direction of a pressure piece movement axis, and wherein the contact surfaces on the pressure piece have a convex curvature in a reference plane region perpendicular to the movement axis of the pressure piece. The same applies to the brake caliper correspondingly for the recess, in which therefore the partial surfaces have contact surfaces for supporting the pressure piece on the pressure piece guide, wherein the contact surfaces extend at least partially in the direction of the pressure piece movement axis, and wherein the contact surfaces on the pressure piece guide have a concave curvature in the reference plane region perpendicular to the movement axis of the pressure piece.

Furthermore, the convex or concave curvature preferably in each case defines a partial circle in the reference plane region.

According to a preferred embodiment, the pressure piece or the brake caliper each has a first contact surface pair for lateral guidance of the pressure piece in the first direction and/or a second contact surface for lateral guidance of the pressure piece in the second direction.

In one aspect, at least one of the contact surfaces of the contact surface pair is formed in the reference plane region in each case by a partial circle section having a first radius $R_1$ and a radius center point C1 and/or the second contact surface is formed in the reference plane region by a partial circle section having a second radius $R_2$ and a second radius center point C2.

The radii $R_1$ and $R_2$ preferably differ from one another in size and/or the radius center points C1 and C2 differ from one another.

In addition, separating surfaces are preferably arranged between the contact surfaces.

In one aspect, the separating surfaces and the partial surfaces of the contact surfaces merge into one another without interruption, in particular continuously, that is to say without kinks and jumps. Such uninterrupted transitions are preferably formed directly between in each case curved surface sections, or uncurved intermediate sections are arranged between in each case two curved surface sections.

According to a preferred embodiment, the pressure piece is designed as a casting. In particular, the separating surfaces are preferably already provided in a contour of a blank of the casting. In this way, the cost for the machining of the pressure piece can be further reduced.

According to a further preferred embodiment, the brake caliper, which has the pressure piece guide, is designed as a casting. In particular, the separating surfaces are preferably already provided in a contour of a blank of the casting. In this way, the cost for the machining of the pressure piece can be further reduced.

The pressure piece and the brake caliper make use of the same advantages as the vehicle brake according to the invention. The preferred embodiments of the vehicle brake are at the same time preferred embodiments of the pressure piece and of the brake caliper and vice versa. Reference is made in this regard to the above explanations, and their content is incorporated here.

BRIEF DESCRIPTION OF THE DRAWINGS

Further advantages, features and details of the invention will become apparent from the following description, the preferred embodiments and the following figures, in which.

DETAILED DESCRIPTION OF THE DRAWINGS

Exemplary embodiments of the invention are now described below with reference to the drawings. These are not necessarily intended to represent the exemplary embodiments to scale; on the contrary, drawings are executed in schematic and/or slightly distorted form, where useful for explanation. With regard to additions to the teachings directly recognizable from the drawings, attention is drawn to the relevant prior art. It should be borne in mind here that many modifications and changes relating to the form and detail of an embodiment can be made without departing from the general concept of the invention. The features of the invention which are disclosed in the description, in the drawings and in the claims may be essential for the development of the invention, both individually and in any desired combination. Moreover, all combinations of at least two of the features disclosed in the description, in the drawings and/or in the claims fall within the scope of the invention. The general concept of the invention is not limited to the exact form or detail of the preferred embodiments shown and described below, nor is it limited to subject matter which would be restricted in comparison with the subject matter claimed in the claims. In the case of specified dimensioning ranges, the intention is also to disclose and claim values lying within the limits mentioned as limit values and to allow for them to be used as desired. For the sake of simplicity, identical parts or parts with identical or similar functions are provided below with the same reference signs.

Figure 1:
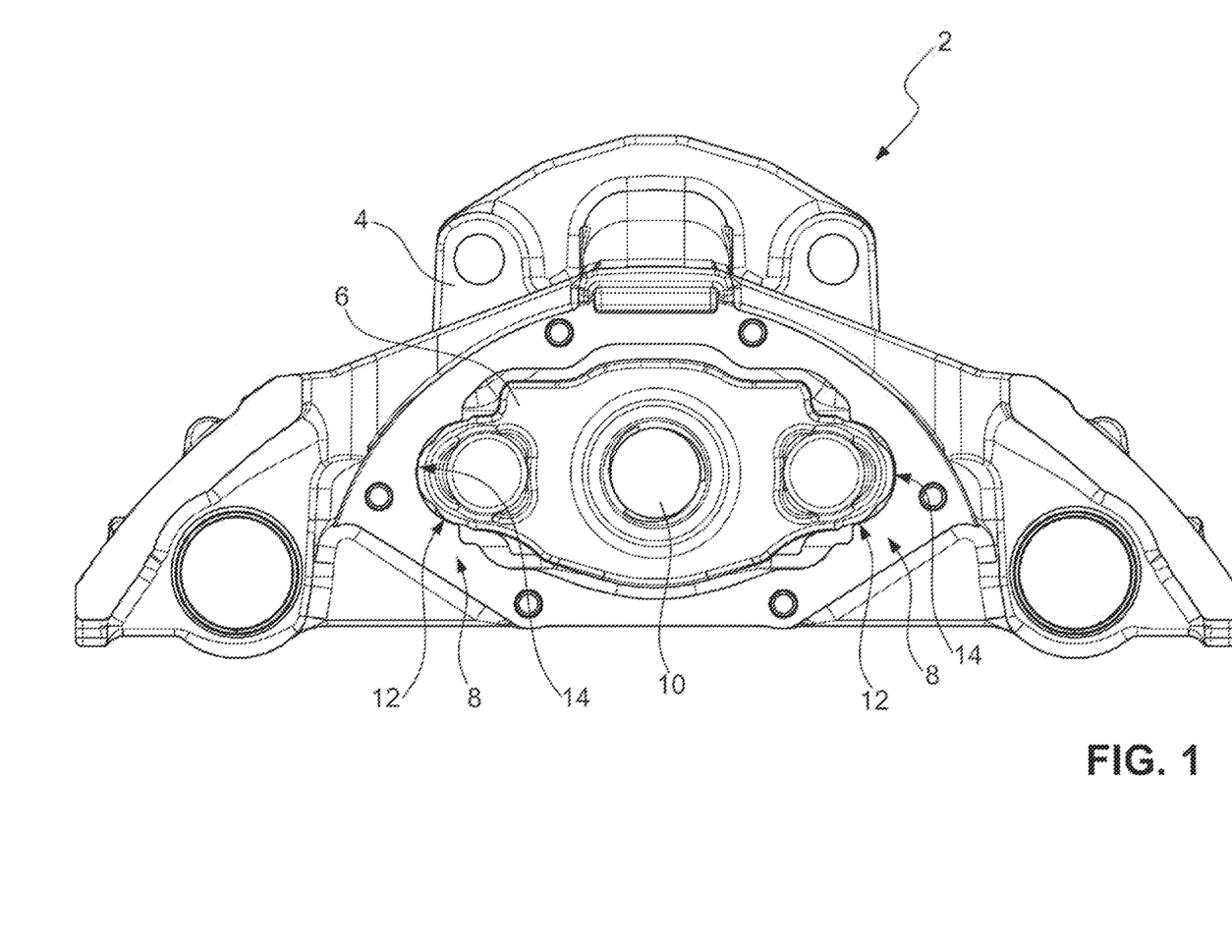
FIG. 1 is a side view of a first exemplary embodiment of a vehicle brake according to the invention having a pressure piece according to the invention.

FIG. 1 shows a vehicle brake 2, which has a brake caliper 4 with a pressure piece guide 8, in which a pressure piece 6 is movably guided along a movement axis 10. The pressure piece guide 8 is designed in such a way that the pressure piece 6 has an outer contour 14 which corresponds to a recess 12 of the brake caliper 4.

Figure 2:
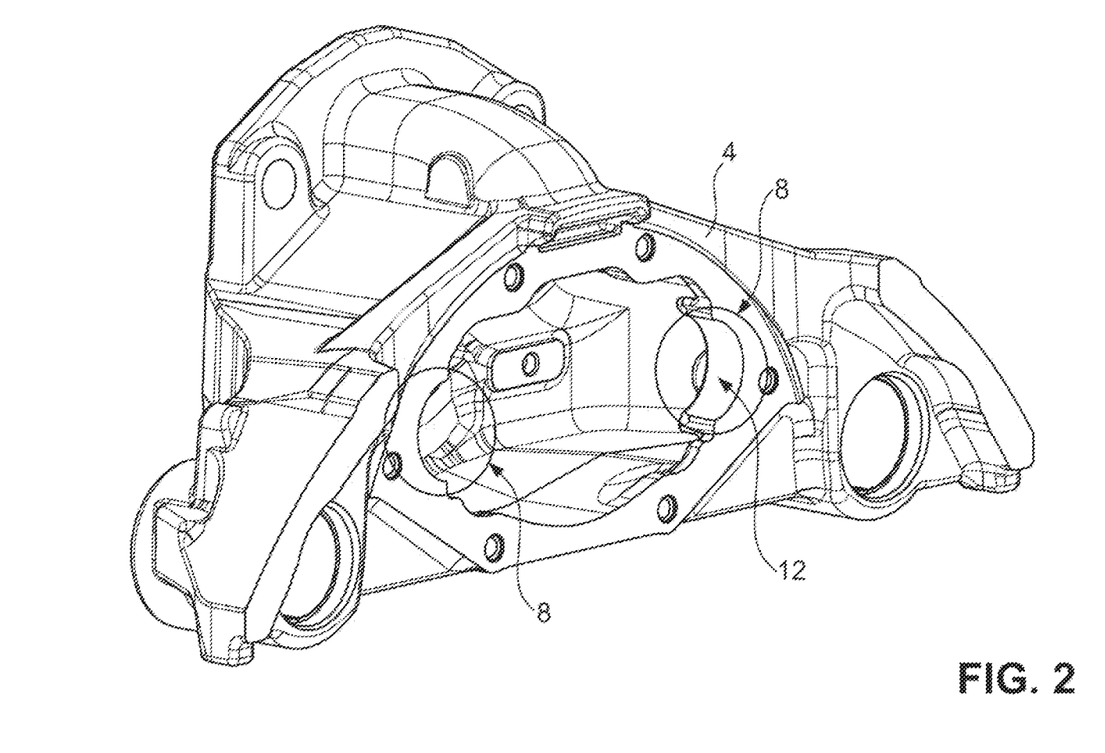
FIG. 2 is a perspective view of a brake caliper according to the invention in accordance with the first exemplary embodiment of the invention.

FIG. 2 shows the brake caliper 4 without the pressure piece 6 in a perspective view. On the brake caliper 4, the pressure piece guide 8 is formed by the recesses 12. As illustrated in FIG. 2, the recesses 12 in the exemplary embodiment shown in FIGS. 1 to 5 are substantially crescent-shaped. The recesses 12 and the brake caliper 4 as a whole includes other aspects of brake calipers known from the prior art.

Figure 3:
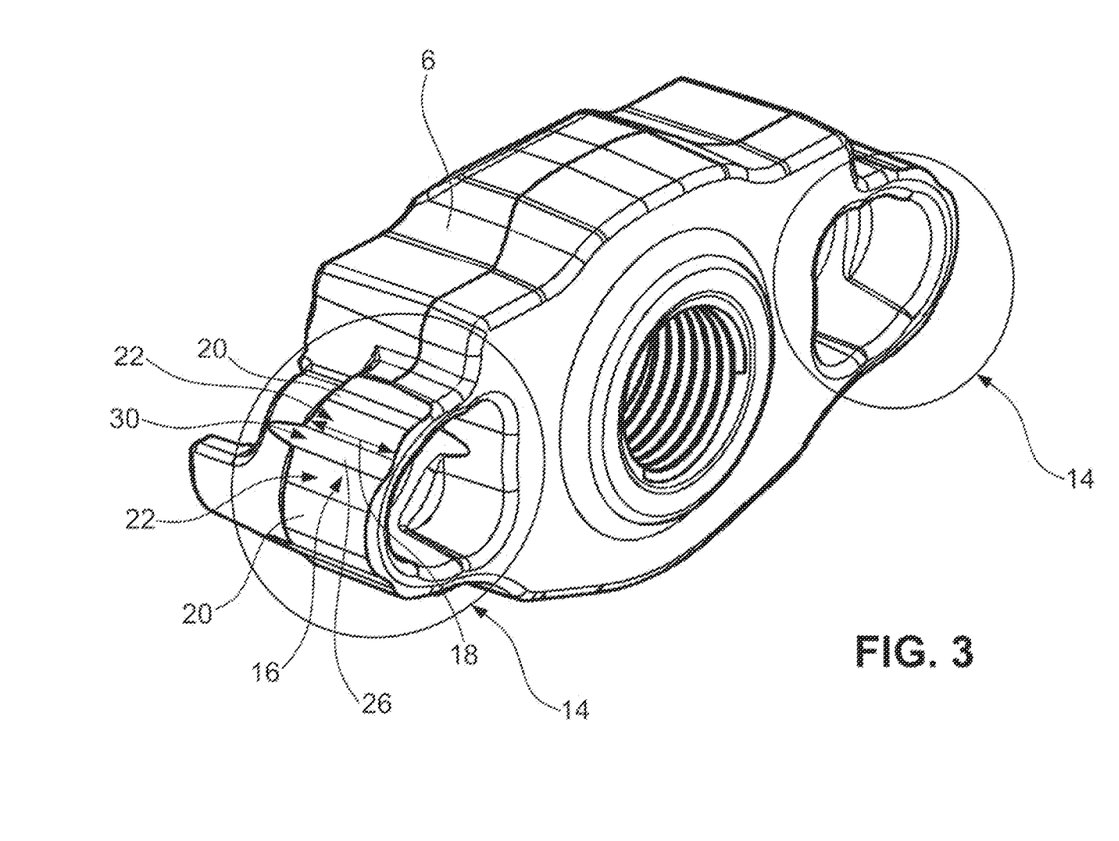
FIG. 3 is a perspective view of a pressure piece according to the invention in accordance with the first exemplary embodiment.

In FIG. 3, the pressure piece 6 is illustrated in perspective. In the region of the outer contours 14 of the pressure piece 6, the pressure piece 6 has partial surfaces 16. In the present case, the partial surfaces 16 are formed by contact surfaces 20, at which the pressure piece 6 comes into contact with the recess 12 of the brake caliper 4, and by separating surfaces 26, in the region of which there is no contact between the pressure piece 6 and the recess 12 of the brake caliper 4. The partial surfaces 16 extend in the direction of the movement axis 10 (cf. FIG. 1) of the pressure piece 6 in a reference plane region 18. The separating surfaces 26 of the pressure piece 6 have a different curvature 30 relative to contact surfaces 20, in this case a curvature which is opposite, at least in some section or sections. The contact surfaces 20 of the pressure piece 6 have a convex curvature 22. The configuration of the contact surfaces 20, in particular selective design of their convex curvature 22, makes it possible according to the invention for lateral guide play of the pressure piece guide 8 in the first and the second direction to be adapted very largely independently of one another. In this case, the pressure piece 6 according to the invention can be used with a brake caliper 4 which has a recess 12.

Figure 4:
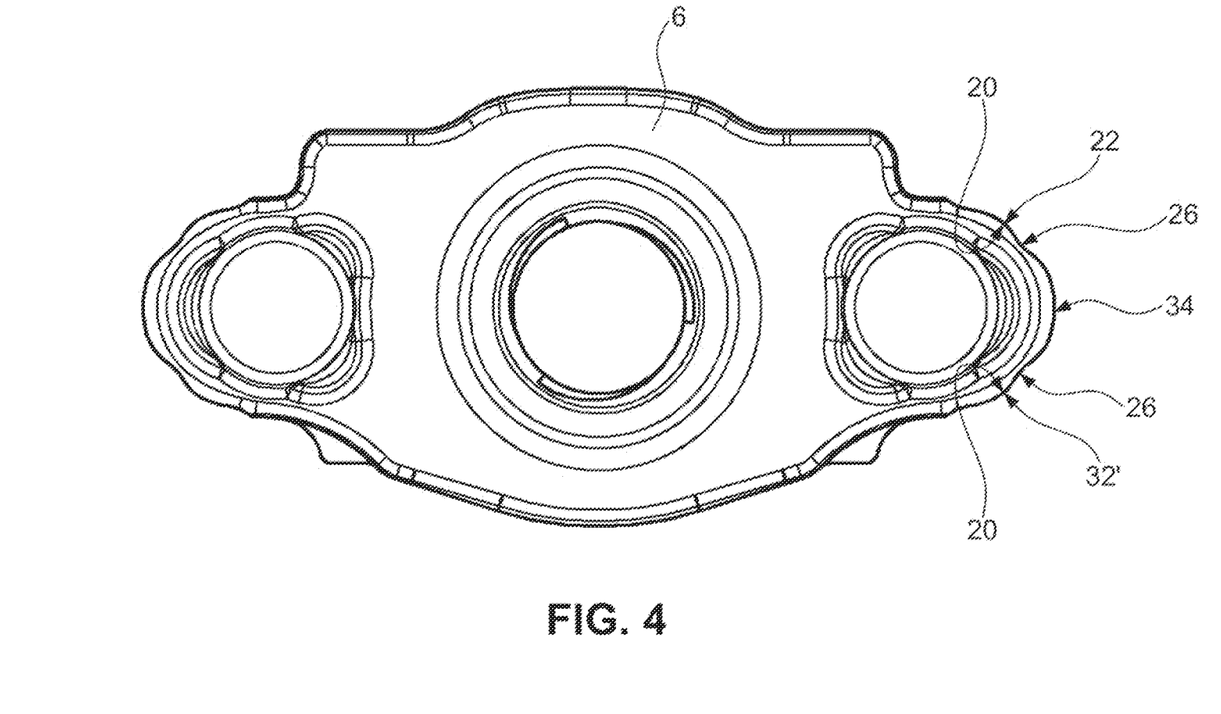
FIG. 4 is a detail view of the outer contour of the pressure piece according to the invention in accordance with the first exemplary embodiment.
Figure 5:
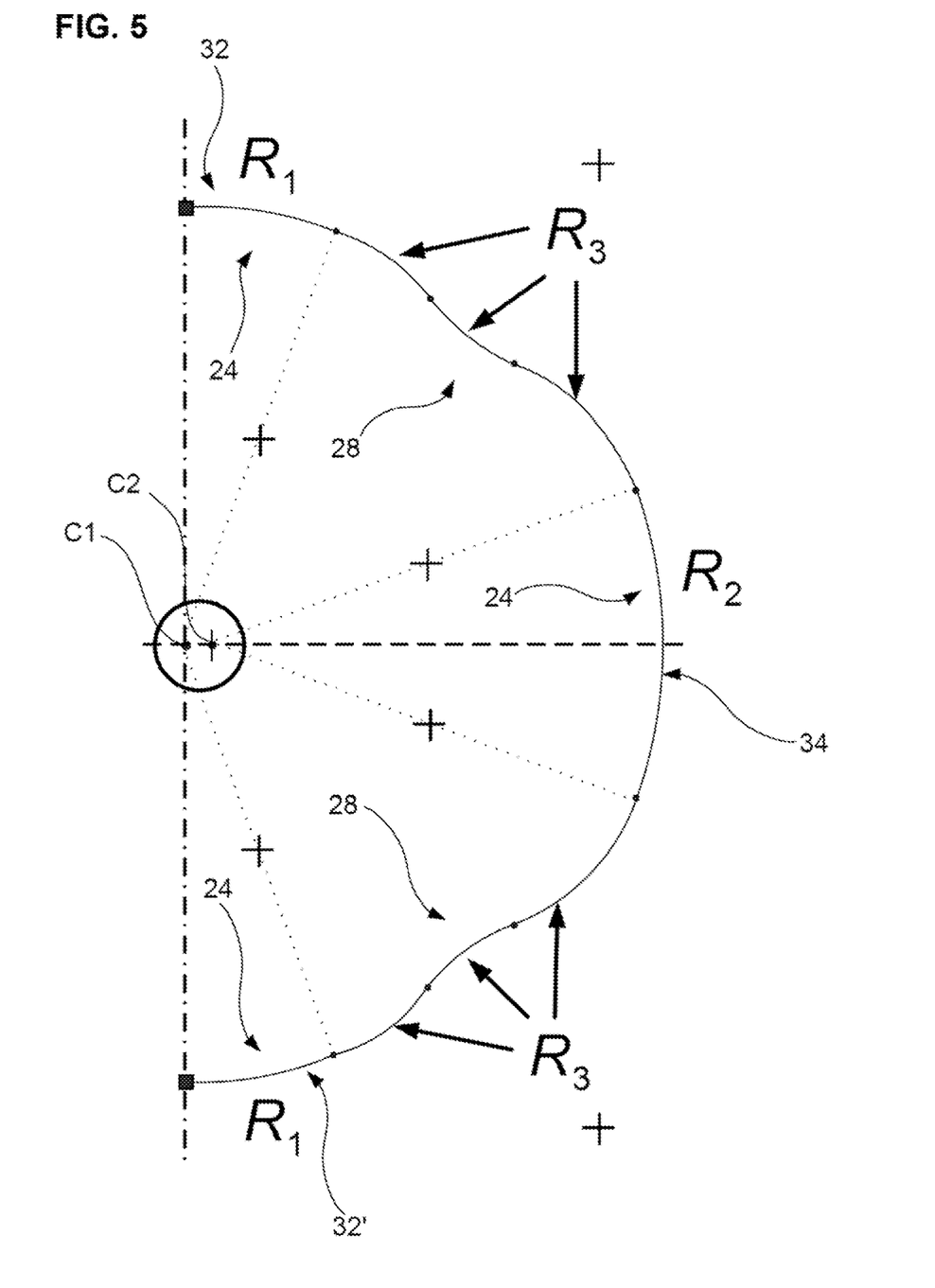
FIG. 5 is a schematic illustration of the outer contour of the pressure piece according to the invention in accordance with the first exemplary embodiment.

The design of the contact surfaces 20 and of the separating surfaces 26 is further detailed in FIGS. 4 and 5. The pressure piece 6 shown in FIGS. 4 and 5 show a first contact surface pair 32, 32' for lateral guidance of the pressure piece 6 in the first direction. By way of selective dimensioning of this contact surface pair 32, 32', the lateral guide play in the first direction can be adapted to the pressure piece guide 8.

In addition, the pressure piece 6 has a second contact surface 34 for lateral guidance of the pressure piece 6 in the second direction. In other words, the second contact surface 34 supports the pressure piece 6 in the second direction, it being possible for the lateral guide play in the second direction with the pressure piece guide 8 to be influenced by way of selective design of the second contact surface 34. A separating surface 26 for decoupling the contact surfaces is arranged between each contact surface 32, 32', 34.

As is illustrated with reference to FIG. 5, the contact surfaces 32, 32' of the first contact surface pair 32, 32' are defined by partial circles 24 having a radius $R_1$ and a radius center point C1 in the reference plane shown in FIG. 5. The second contact surface 34 for lateral guidance of the pressure piece 6 in the second direction has a radius $R_2$ and a second radius center point C2 The radius center points C1 and C2 preferably differ from one another. In addition or as an alternative, the radii $R_1$ and $R_2$ are also dimensioned differently from one another in size. Separating surface partial circles 28 having a radius $R_3$ are arranged between the partial circles 24 of the contact surfaces 20.

FIGS. 6 to 10 show an alternative exemplary embodiment of a vehicle brake 102, wherein, in contrast to the exemplary embodiment shown in FIGS. 1 to 5, partial surfaces 116 are arranged in recess 112 of brake caliper 104. In this exemplary embodiment, pressure piece 106 can be used with the brake caliper 104.

Figure 6:
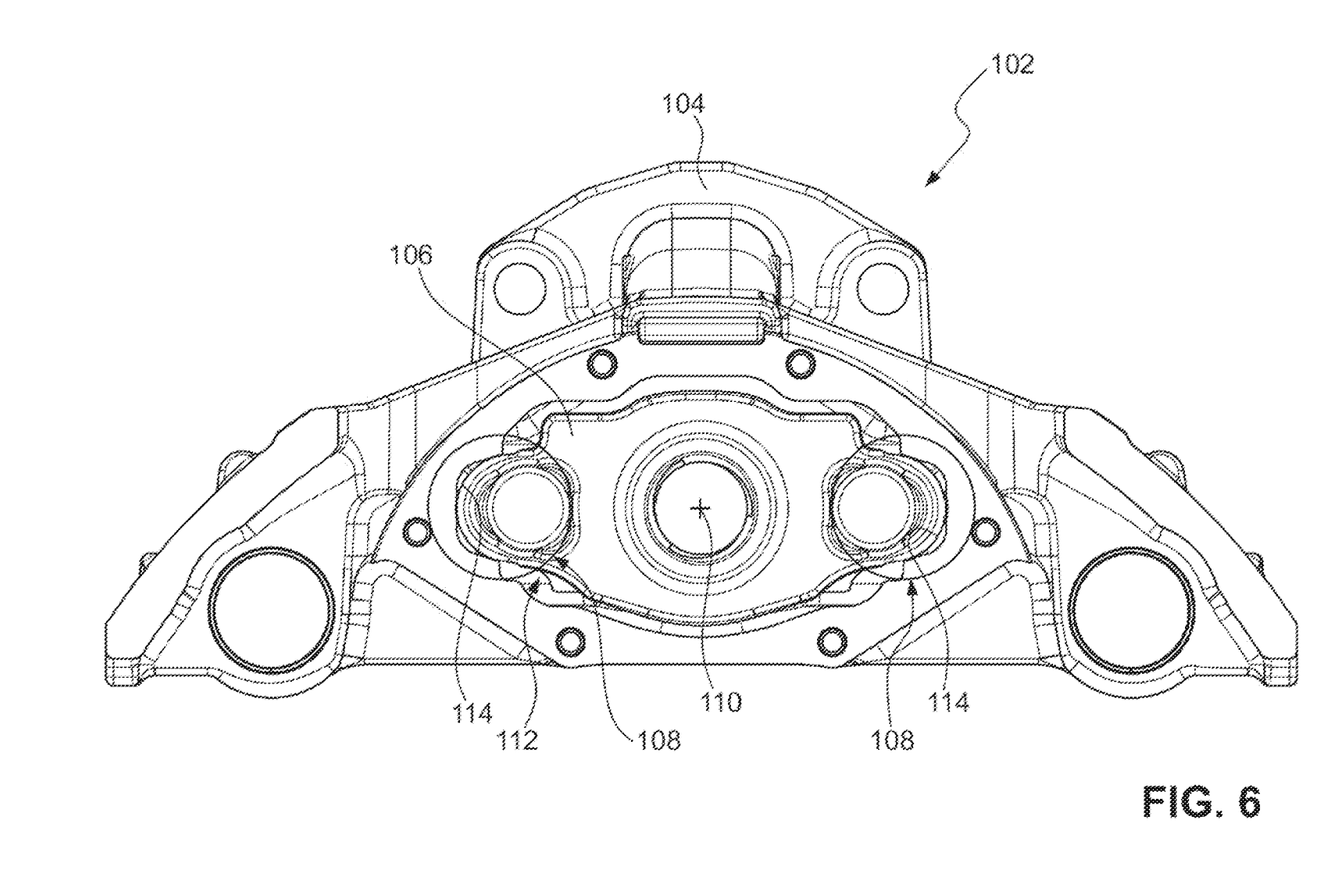
FIG. 6 is a side view of a second exemplary embodiment of a vehicle brake according to the invention having a pressure piece.

FIG. 6 shows vehicle brake 102, which has brake caliper 104 in which pressure piece 106 is movably guided along a movement axis 110 by way of a pressure piece guide 108. The brake caliper 104 has recesses 112 which correspond substantially to an outer contour 114 of the pressure piece 106.

Figure 7:
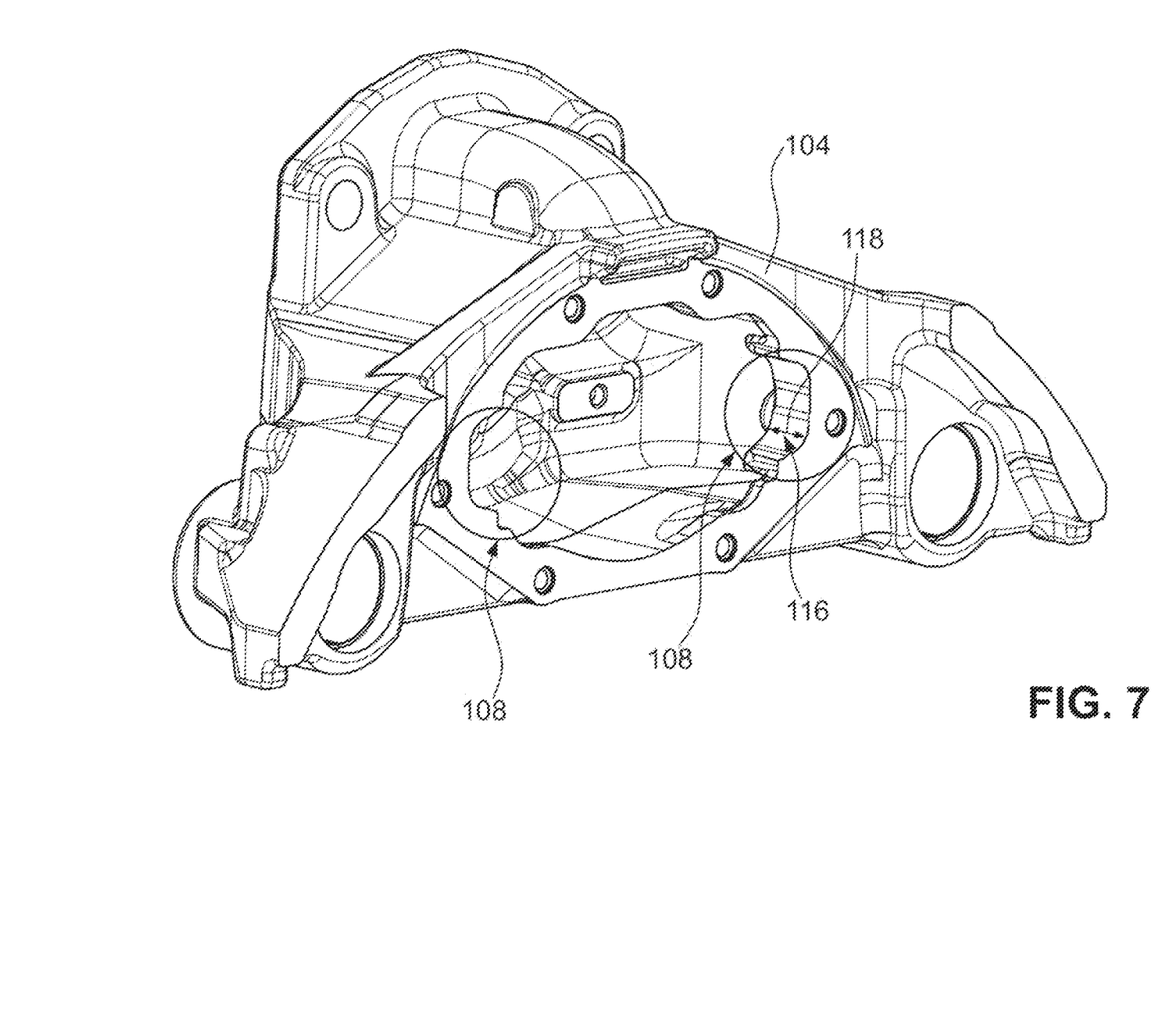
FIG. 7 is a perspective view of a brake caliper of a vehicle brake in accordance with the second exemplary embodiment.

FIG. 7 shows a perspective illustration of the brake caliper 104 with the pressure piece guides 108. The pressure piece guides 108 have partial surfaces 116 which extend in a reference plane region 118 along the movement axis 110 of the pressure piece 106 (cf. FIG. 1).

Figure 8:
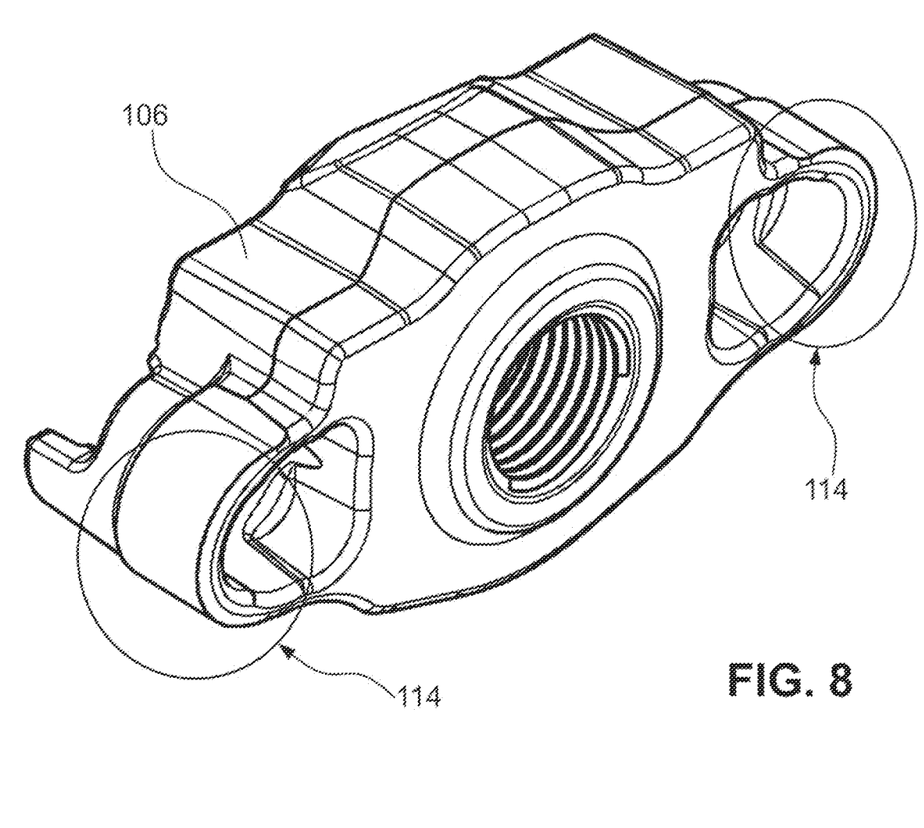
FIG. 8 is a perspective view of a pressure piece in accordance with the second exemplary embodiment of the invention.
Figure 9:
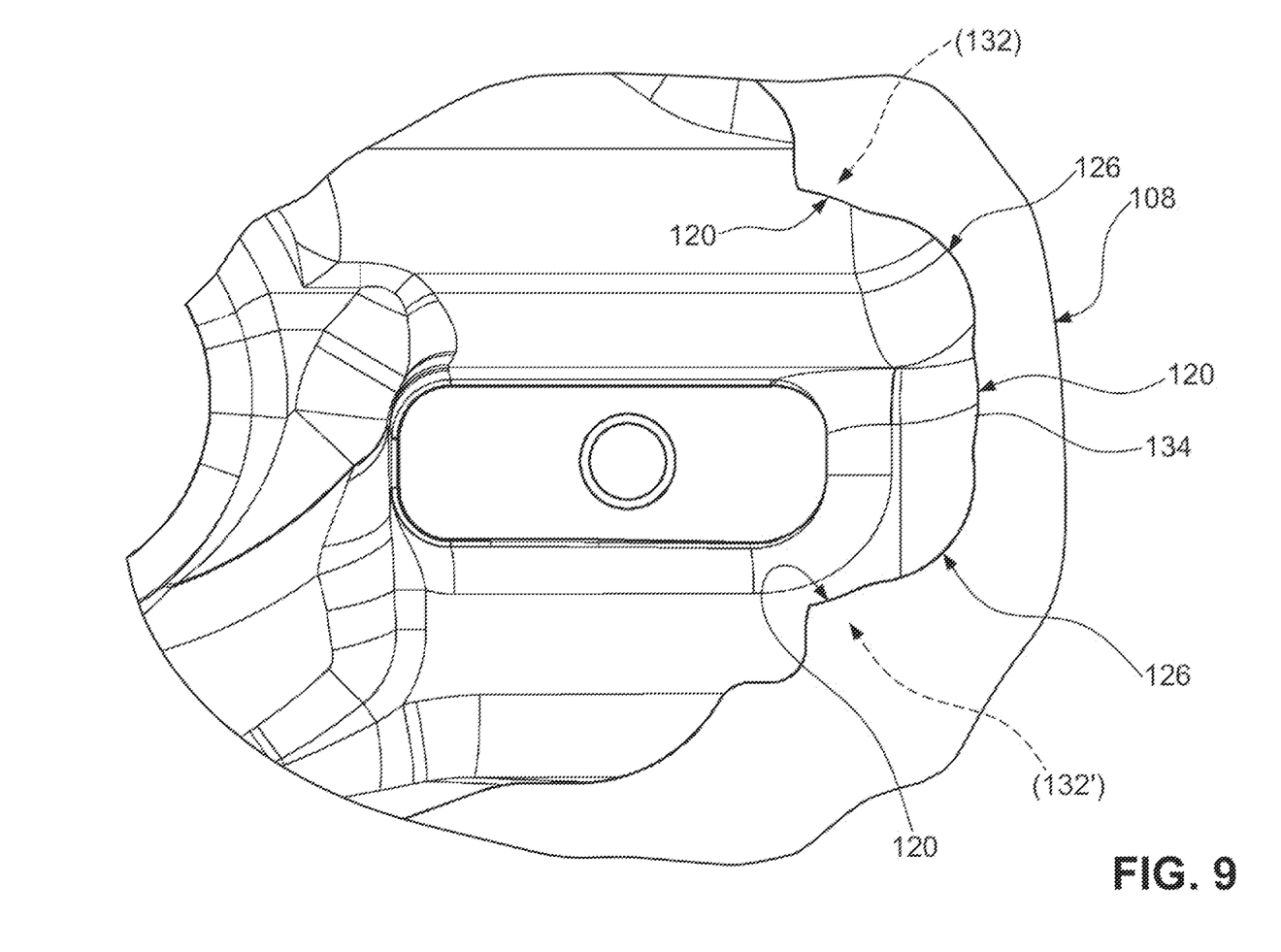
FIG. 9 is a detail view of a pressure piece guide in accordance with the second exemplary embodiment of the invention.

As shown in FIG. 8, it is possible in this exemplary embodiment to use pressure piece 106 having substantially crescent-shaped outer contours 114. FIG. 9 shows a detail view of the brake caliper 104 with the contact surfaces 120 and the separating surfaces 126, which form part of the pressure piece guide 108. The contact surfaces 120 have a first contact surface pair 132, 132' for lateral guidance of a pressure piece 106 in the first direction. The second contact surface 134 serves for lateral guidance of the pressure piece 106 in the second direction.

Figure 10:
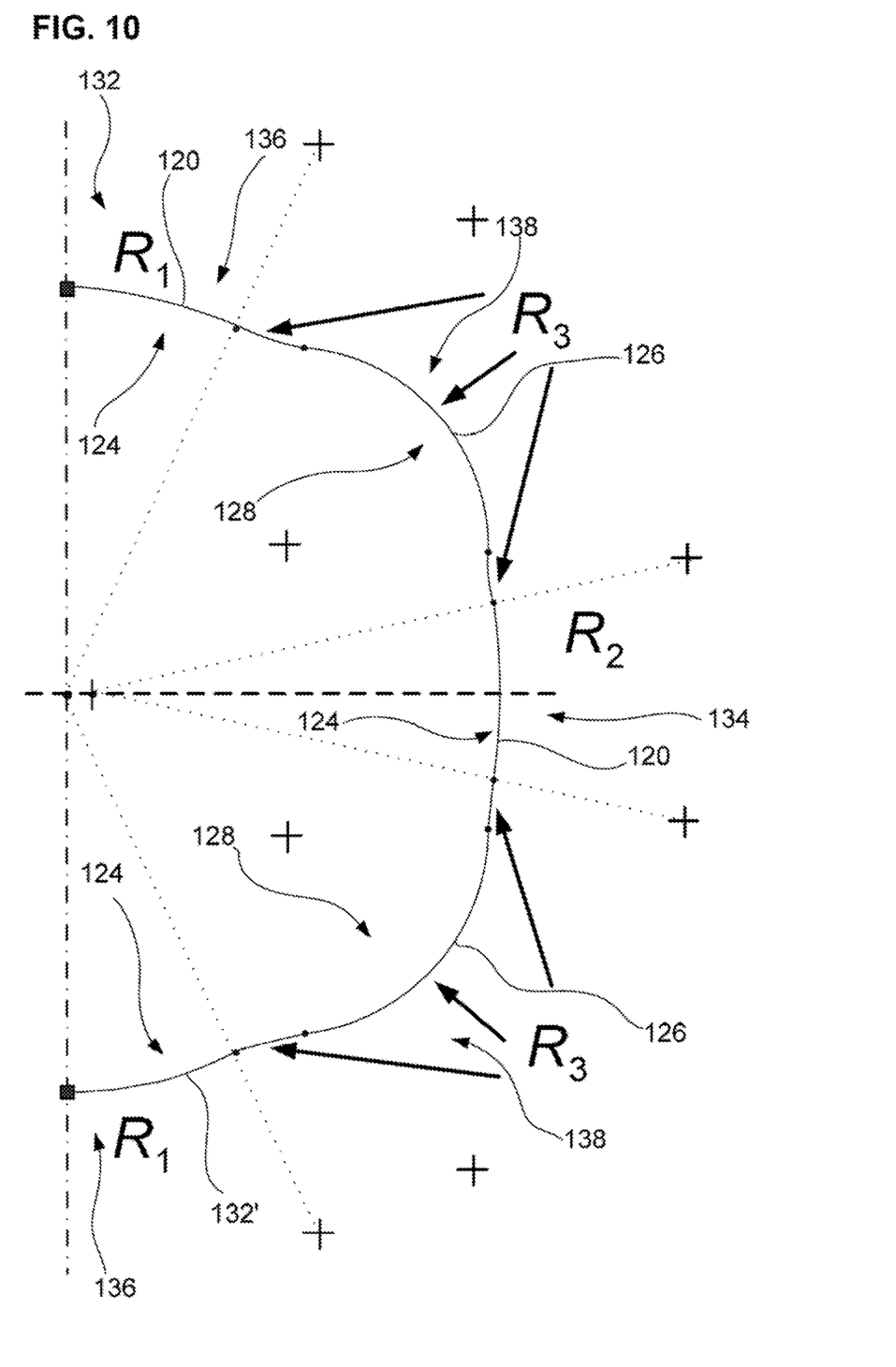
FIG. 10 is a schematic illustration of a pressure piece guide in accordance with the second exemplary embodiment of the invention.

As can be seen from FIG. 10, the contact surfaces 120 are formed by partial circles 124. These have a concave curvature 136. On the other hand, although the separating surfaces 126 are likewise formed by partial circles 128, these have a curvature 138 which differs from that of the contact surfaces 120, with the result that, when the pressure piece 106 is installed in the brake, there is a spacing between the pressure piece 106 and the pressure piece guide 108 in these regions. The contact surfaces 120 of the first contact surface pair 132, 132' have a radius $R_1'$ and a radius center point C1'. The second contact surface 134 for lateral guidance of the pressure piece 106 in the second direction has a radius $R_2'$ and a second radius center point C2'. In the exemplary embodiment shown in FIG. 10, both the radius center points C1' and C2' and the radii $R_1'$ and $R_2'$ differ from one another. By selectively influencing the radius center points C1' and C2' and the radii $R_1'$ and $R_2'$, very largely independent setting of the lateral guide play is accomplished in the first direction and the second direction between the pressure piece 106 and the brake caliper 104 in the pressure piece guide 108.

The contact surfaces 120 are formed by partial circles 124. The separating surfaces 126 are likewise formed by partial circles 128. In the present case, the partial circles of the contact surfaces 124 merge without interruption into the partial circles of the separating surfaces 128. The partial circles of the contact surfaces 124 have a concave curvature 136.

It should be borne in mind here that many modifications and changes relating to the form and detail of an embodiment can be made without departing from the general concept of the invention. The features of the invention which are disclosed in the description, in the drawings and in the claims may be essential for the development of the invention, both individually and in any desired combination. Moreover, all combinations of at least two of the features disclosed in the description, in the drawings and/or in the claims fall within the scope of the invention. The general concept of the invention is not limited to the exact form or detail of the preferred embodiments shown and described above, nor is it limited to subject matter which would be restricted in comparison with the subject matter claimed in the claims. In the case of specified dimensioning ranges, the intention is also to disclose and claim values lying within the limits mentioned as limit values and to allow for them to be used as desired.

The invention claimed is:

1. A vehicle brake (2, 102), in particular a utility vehicle compressed-air disk brake, the vehicle brake comprising:
a brake caliper (4, 104),
a pressure piece guide (8, 108) arranged in the brake caliper (4, 104), and
a pressure piece (6, 106), wherein the pressure piece is guided in the pressure piece guide (8, 108) along a movement axis (10, 110),
wherein the pressure piece guide (8, 108) defines a recess (12, 112), and the pressure piece (6, 106) has an outer contour (14, 114) corresponding to the recess,
wherein the pressure piece guide (108) or the outer contour (14) of the pressure piece is divided, on both sides of the pressure piece (6), into a plurality of curved, mutually spaced partial surfaces (16, 116) defining separate curved sections;
wherein the outer contour comprises projecting ear portions on each lateral side of the pressure piece that project outwardly from an overall perimeter of the pressure piece and are laterally outermost portions of the pressure piece, wherein the projecting ear portions defines a generally semi-circular outer surface shape, wherein the separate curved sections extend along the outer surface shape of the projecting ear portions at an interface between the projecting ear portions and the corresponding recess that receives the projecting ear portions.

2. The vehicle brake (2, 102) as claimed in claim 1, wherein the partial surfaces (16, 116) have contact surfaces (20, 120) on the outer contour (14) or on the pressure piece guide (108) for supporting the pressure piece (6, 106) on the pressure piece guide (8, 108), wherein the contact surfaces (20, 120) extend at least partially in the direction of the movement axis (10, 110), and wherein the contact surfaces (20) on the pressure piece (6) have a convex curvature (22) in a reference plane region (18, 118) perpendicular to the movement axis (10) of the pressure piece (6), or the contact surfaces (120) on the pressure piece guide (108) have a concave curvature (136) in the reference plane region (118).

3. The vehicle brake (2, 102) as claimed in claim 2, wherein the concave curvature (136) or the convex curvature (22) defines a partial circle (24, 124) in the reference plane region (18, 118).

4. The vehicle brake (2, 102) as claimed in claim 2, wherein the pressure piece guide (108) or the pressure piece (6) has a first contact surface pair (32, 32', 132, 132') for lateral guidance of the pressure piece (6, 106) in a first direction orthogonal to the movement axis (10, 110) and a second contact surface (34, 134) for lateral guidance of the pressure piece (6, 106) in a second direction orthogonal to the movement axis (10, 110) and perpendicular to the first direction.

5. The vehicle brake (2, 102) as claimed in claim 4, wherein at least one of the contact surfaces (20, 120) of the first contact surface pair (32, 32, 132, 132') is formed in the reference plane region (18, 118) in each case by a partial circle section (24, 124) having a first radius ($R_1$) and a radius center point (C1), and the second contact surface (34, 134) is formed in the reference plane region (18, 118) by a partial circle section (24, 124) having a second radius ($R_2$) and a second radius center point (C2).

6. The vehicle brake (2, 102) as claimed in claim 5, wherein the first radius ($R_1$) and the second radius ($R_2$) differ from one another in size.

7. The vehicle brake (2, 102) as claimed in claim 5, wherein the first and second radius center points (C1) and (C2) differ from one another.

8. The vehicle brake (2, 102) as claimed in claim 2, wherein separating surfaces (26, 126) are arranged between the contact surfaces (20, 120).

9. The vehicle brake (2, 102) as claimed in claim 8, wherein the separating surfaces (126) of the pressure piece guide (108) have a curvature (138) in the reference plane region (118) which differs from the curvature of the contact surfaces, or the separating surfaces (26) on the pressure piece (6) have a curvature (30) in the reference plane region (18) which differs from the curvature of the contact surfaces.

10. The vehicle brake (2, 102) as claimed in claim 8, wherein at least one of the separating surfaces (26, 126) defines a partial circle (28, 128) in the reference plane region (18, 118) at least in some section or sections.

11. The vehicle brake (2, 102) as claimed in claim 8, wherein the separating surfaces (26, 126) and the partial surfaces (16, 116) of the contact surfaces (20, 120) merge into one another without interruption.

12. The vehicle brake (2, 102) as claimed in claim 1, wherein uncurved intermediate sections are arranged at a transition between two of the contact surfaces having the concave or convex curvatures (22, 30, 136, 138).

13. A pressure piece (6) for a vehicle brake (2, 102), in particular for a utility vehicle compressed-air disk brake, the pressure piece comprising:
- an outer contour (14) configured for being received in a corresponding pressure piece guide having recesses corresponding to the outer contour;
- wherein the outer contour (14) is divided into a plurality of mutually spaced partial surfaces (16) defining separate curved sections;
- wherein the outer contour comprises projecting ear portions on each lateral side of the pressure piece that project outwardly from an overall perimeter of the pressure piece and are laterally outermost portions of the pressure piece, wherein the projecting ear portions defines a generally semi-circular outer surface shape, wherein the separate curved sections extend along the outer surface shape of the projecting ear portions on the projecting ear portions for an interface with the corresponding recess that receives the projecting ear portions.

14. The pressure piece (6) as claimed in claim 13,
- wherein the partial surfaces (16) have contact surfaces (20) for supporting the pressure piece (6) on a pressure piece guide (8) for movement along a pressure piece movement axis (10),
- wherein the contact surfaces (20) extend at least partially in the direction of the pressure piece movement axis (10), and
- wherein the contact surfaces (20) have a convex curvature (22) in a reference plane region (18) perpendicular to the movement axis (10) of the pressure piece (6).

15. The pressure piece (6) as claimed in claim 14, wherein the convex curvature (22) defines a partial circle (24) in the reference plane region (18).

16. The pressure piece (6) as claimed in claim 14,
- wherein the pressure piece (6) has a first contact surface pair (32, 32') for lateral guidance of the pressure piece (6) in a first direction orthogonal to the movement axis (10), and a second contact surface (34) for lateral guidance of the pressure piece (6) in a second direction orthogonal to the movement axis and perpendicular to the first direction.

17. The pressure piece (6) as claimed in claim 16,
- wherein at least one of the contact surfaces (20) of the contact surface pair (32, 32') is formed in the reference plane region (18) in each case by a partial circle section (24) having a first radius ($R_1$) and a radius center point (C1), and
- the second contact surface (34) is formed in the reference plane region (18) by a partial circle section (24) having a second radius ($R_2$) and a second radius center point (C2).

18. The pressure piece (6) as claimed in claim 17,
- wherein the radii ($R_1$) and ($R_2$) differ from one another in size and the radius center points (C1) and (C2) differ from one another.

19. The pressure piece (6) as claimed in claim 13,
- wherein separating surfaces (26) are arranged between the contact surfaces (20), wherein the separating surfaces (26) on the pressure piece (6) have a concave curvature (30) in the reference plane region (18).

20. The pressure piece (6) as claimed in claim 19,
- wherein at least two concave or convex curved sections (22, 30) defined by the contact surfaces (20) or the separating surfaces (26) merge into one another without interruption or uncurved intermediate sections are arranged at a transition between two of the curved sections (22, 30).

* * * * *